US009415861B2

(12) United States Patent
Berens

(10) Patent No.: US 9,415,861 B2
(45) Date of Patent: Aug. 16, 2016

(54) CONTROL SYSTEM FOR AIRCRAFT HIGH LIFT DEVICES AND METHOD FOR CONTROLLING THE CONFIGURATION OF AIRCRAFT HIGH LIFT DEVICES

(71) Applicant: Airbus Operations GmbH, Hamburg (DE)

(72) Inventor: Martin Berens, Hamburg (DE)

(73) Assignee: Airbus Operations GmbH (DE)

(*) Notice: Subject to any disclaimer, the term of this patent is extended or adjusted under 35 U.S.C. 154(b) by 0 days.

(21) Appl. No.: 14/630,812

(22) Filed: Feb. 25, 2015

(65) Prior Publication Data
US 2015/0239550 A1      Aug. 27, 2015

(30) Foreign Application Priority Data

Feb. 27, 2014   (EP) ..................... 14156914

(51) Int. Cl.
*B64C 13/00* (2006.01)
*B64C 13/16* (2006.01)
*B64C 9/16* (2006.01)
*B64C 9/22* (2006.01)

(52) U.S. Cl.
CPC . *B64C 13/16* (2013.01); *B64C 9/16* (2013.01); *B64C 9/22* (2013.01)

(58) Field of Classification Search
CPC .......... B64C 13/00; B64C 13/02; B64C 13/16
USPC ............................ 244/76 A, 76 R, 181, 183
See application file for complete search history.

(56) References Cited

U.S. PATENT DOCUMENTS

| 2,350,751 | A |   | 6/1944 | Gluibich |
|---|---|---|---|---|
| 4,042,197 | A |   | 8/1977 | Boyle et al. |
| 2007/0185628 | A1 | * | 8/2007 | Delaplace ............ G05D 1/0066 701/4 |
| 2010/0200704 | A1 | * | 8/2010 | Berens ..................... B64C 9/16 244/76 A |

FOREIGN PATENT DOCUMENTS

| DE | 639329 C | 12/1936 |
|---|---|---|
| DE | 25 31 799 A1 | 2/1977 |
| DE | 10 2007 045 547 A1 | 4/2009 |
| EP | 1 684 144 A1 | 7/2006 |

OTHER PUBLICATIONS

EP Search Report (EP 14156914.5) dated Sep. 4, 2014.

* cited by examiner

*Primary Examiner* — Christopher P Ellis
*Assistant Examiner* — Richard G Davis
(74) *Attorney, Agent, or Firm* — Lerner, David, Littenberg, Krumholz & Mentlik, LLP

(57) ABSTRACT

A control system for an aircraft high lift device includes a threshold setting unit configured to output one of a plurality of configuration change thresholds as an active output threshold, a threshold deactivation unit coupled to the threshold setting unit and configured to temporarily increase the active output threshold to a deactivation value, a configuration setting unit coupled to the threshold deactivation unit and configured to set the aircraft high lift device from a first configuration to a second configuration, if a measured value of an angle-of-attack of the aircraft exceeds the active output threshold, and a threshold control unit configured to control the threshold deactivation unit to temporarily increase the active output threshold to the deactivation value while the aircraft high lift device is mechanically moving from a first configuration to a second configuration.

15 Claims, 2 Drawing Sheets

CONTROL SYSTEM FOR AIRCRAFT HIGH LIFT DEVICES AND METHOD FOR CONTROLLING THE CONFIGURATION OF AIRCRAFT HIGH LIFT DEVICES

FIELD OF THE INVENTION

The present invention relates to a control system for aircraft high lift devices and a method for controlling the configuration of aircraft high lift devices, particularly passive high lift devices of aircraft with fixed wings.

BACKGROUND OF THE INVENTION

Aircraft usually have several movable control surfaces attached to the trailing and/or leading edges of a wing that are used to fulfil different functions, for example increasing wing maximum lift. Amongst the numerous effective means that increase wing maximum lift, movable wing leading and trailing edge control surfaces may include for example single slotted leading edge slats (generally denoted as "slats" hereinforth) and single or multiple slotted trailing edge flaps (generally denoted as "flaps" hereinforth) which are employed in many aircraft models.

These high lift devices are usually controlled manually by the cockpit crew by means of a slats/flaps (S/F) lever. The lever can usually be set into discrete positions related to predefined S/F configurations. In case of large transport aircraft, slats and flaps are usually moved by means of hydraulically or electrically powered actuators. For these type of systems electrical control signals are provided from the S/F lever to a control device which in turn sends control signals to the actuators that move the slats and/or flaps into the commanded positions.

Normally, slats and/or flaps are extended before the take-off run, for holding flight and for the approach and landing flight phases. High lift devices are usually retracted after the initial climb phase following the take-off or go-around in order to reduce drag as well as after landing. Hence, slats and/or flaps are held in a retracted position in climbing and cruise flight phases as well as during ground operation (taxiing, parking). The increased maximum lift coefficient during take-off and initial climb phases on the one hand and during approach and landing flight phases on the other hand allows reduced flight speed and enhances aircraft performance, for example by allowing increased payload depending on runway length, ambient atmospheric conditions and similar external influence parameters.

The optimum aircraft speed for retraction of high lift devices usually differs from the optimum aircraft speed for extension of the respective high lift devices. This is mainly due to there being limited allowed speed ranges for each configuration of a high lift device. As such, the speed ranges of adjacent configurations of a high lift device need to at least partially overlap in order to allow for efficient configuration control of the high lift device. The extent of the operational allowed speed ranges, the aerodynamic and structural performance of the high lift devices as well as the required degree of performance optimization may be considered to determine the required number of configurations for high lift devices. As an example, the single-aisle jetliner passenger aircraft A320 of Airbus has 6 discrete configurations for high lift devices, termed "0", "1", "1+F", "2", "3" and "Full".

Occasionally leading edge high lift devices may not only be used to increase the margin between the actual and the maximum lift coefficient, that is in a planned deployment mode, but they can also be used to prevent the wing from stalling, if the actual lift coefficient gets close to the maximum lift of the wing, that is in an ad hoc deployment mode. For example, leading edge devices may be automatically deployed in the latter case once a maximum acceptable angle of attack has been reached.

Such an automatic system for ad hoc deployment is for example described in document DE 639,329 A. The leading edge slats according to this document are directly actuated by fluid forces so the slats are deployed once an angle of attack greater than the extension angle has been reached, while the devices are going to be retracted when the angle of attack is reduced to values corresponding to a retraction angle of attack. Airspeed dependent automatic functions may retract slats and particularly flaps at high speed in order to prevent the devices from overload such as for example disclosed in the documents U.S. Pat. No. 2,350,751 A, DE 25 31 799 C3, U.S. Pat. No. 4,042,197 A and EP 1 684 144 A1. In these documents, configurations of high lift devices are controlled for example by airspeed, dynamic pressure and/or distance from a defined point on the ground. Further speed dependent high lift device setting functions featuring separate take-off and approach modes for enhanced aircraft performance during high lift device retraction and deployment phases are disclosed in the document DE 10 2007 045 547 A1.

BRIEF SUMMARY OF THE INVENTION

One idea of the invention is to provide a control mechanism for high lift devices of aircraft wings, in particular high lift devices that modify the effective camber of the respective aircraft wing, which mechanism allows for an automatic setting of the high lift device configuration when conventional aircraft speed signals become unavailable. The control mechanism should be robust and lead to a fully determinable aircraft behaviour in all flight situations.

A first aspect of the invention is directed to a control system for an aircraft high lift device, the control system comprising a threshold setting unit configured to output one of a plurality of configuration change thresholds as an active output threshold, a threshold deactivation unit coupled to the threshold setting unit and configured to temporarily increase the active output threshold to a deactivation value, a configuration setting unit coupled to the threshold deactivation unit and configured to set the aircraft high lift device from a first configuration to a second configuration, if a measured value of an angle-of-attack of the aircraft exceeds the active output threshold, and a threshold control unit configured to control the threshold deactivation unit to temporarily increase the active output threshold to the deactivation value while the aircraft high lift device is mechanically moving from a first configuration to a second configuration.

A second aspect of the invention is directed to a method for controlling an aircraft high lift device, the method comprising selecting one of a plurality of configuration change thresholds as an active output threshold; comparing a measured value of an angle-of-attack of the aircraft with the active output threshold; setting the aircraft high lift device from a first configuration to a second configuration, if the measured value of an angle-of-attack exceeds the active output threshold; selecting another one of the plurality of configuration change thresholds as active output threshold, if the aircraft high lift device is set from a first configuration to a second configuration; and temporarily increasing the active output threshold to a deactivation value, while the aircraft high lift device is mechanically moving from a first configuration to a second configuration.

A third aspect of the invention is directed to an aircraft, comprising a fixed wing having at least one high lift device, and a control system according to the first aspect of the invention, the control system being configured to control the at least one high lift device.

An idea on which the present invention is based is to provide for automatic high lift device configuration setting in case of occurring maintenance errors or other faults such as an icing or other obstruction of Pitot and/or static pressure probes that are commonly used to measure aircraft speed. An aspect of the invention may reduce the pilot workload in flight phases associated to take-off and landing.

The general concept relies on determination or measurement of the angle-of-attack (AoA—the angle between the direction of air motion relative to the aircraft and a surface that on the one hand coincides with the fuselage datum line and which is on the other hand perpendicular to the aircraft plane of symmetry) in order to automatically control leading edge as well as trailing edge high lift devices based on the measured respectively otherwise determined AoA. An associated control logic for high lift devices implements stepwise and intermittently operating function using actual position information of the high lift devices, thereby ensuring that cycling through the configuration states is self-consistent, controlled and predictable.

According to an embodiment of the control system, the control system may further comprise a comparator coupled between the threshold deactivation unit and the configuration setting unit, which comparator is configured to receive the measured value of the angle-of-attack of the aircraft high lift device, to compare the received value of the angle-of-attack with the active output threshold and to output a configuration change signal to the configuration setting unit based on the comparison of the received value of the angle-of-attack and the active output threshold.

According to a further embodiment of the control system, the threshold control unit may further be configured to control the threshold setting unit to select one of the plurality of configuration change thresholds as the active output threshold dependent on the current configuration set by the configuration setting unit.

According to a further embodiment of the control system, the control system may further comprise a low pass filter coupled between the threshold deactivation unit and the comparator, the low pass filter being configured to filter the value of the active output threshold output by the threshold deactivation unit. The low pass filter advantageously allows for gradual and asymptotical adaption of the active output threshold to the desired fixed value threshold. Providing a low pass filter enables a variable delay time between reaching a stable device position after a configuration change and the triggering of a subsequent configuration change. That way, an appropriate trade-off may be found between stability of the automatic high lift device control and flexibility to react to various degrees of rise in AoA.

According to a further embodiment of the control system, the threshold control unit may further be configured to temporarily deactivate the low pass filter while the aircraft high lift device is mechanically moving from a first configuration to a second configuration.

According to a further embodiment of the control system, the threshold control unit may further be configured to adjust the selected configuration change threshold dependent on a measured normal load factor.

According to an embodiment of the aircraft, the high lift device may comprise a trailing edge high lift device, particularly a flap. Trailing edge high lift devices are usually high lift devices that alter the camber of the wing upon changing their configuration. Therefore, a unique relationship between the AoA and the lift coefficient is to be accounted for, depending on the current configuration setting.

According to an embodiment of the method, the method may further comprise outputting a configuration change signal based on the comparison of the received value of the angle-of-attack and the active output threshold.

According to another embodiment of the method, selecting another one of the plurality of configuration change thresholds as the active output threshold may be dependent on the current configuration set by the configuration setting unit.

According to a further embodiment of the method, the method may further comprise low-pass filtering the value of the selected active output threshold.

According to a further embodiment of the method, the method may further comprise temporarily deactivating the low-pass filtering of the value of the selected active output threshold while the aircraft high lift device is mechanically moving from a first configuration to a second configuration.

According to a further embodiment of the method, the method may further comprise adjusting the selected configuration change threshold dependent on a measured normal load factor.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
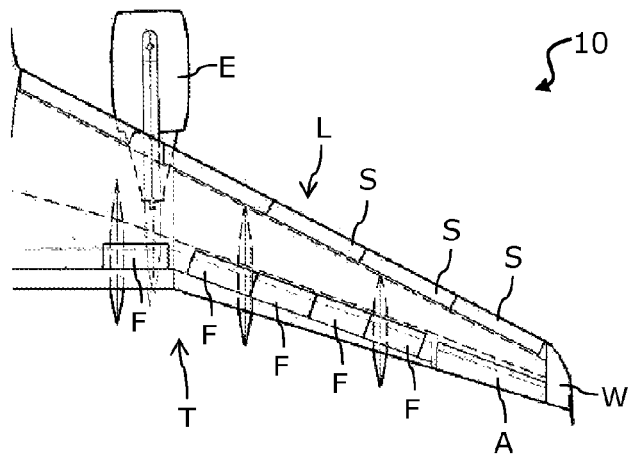
FIG. 1 schematically illustrates an aircraft wing according to an embodiment of the present invention.

In the figures, like reference numerals denote like or functionally like components, unless indicated otherwise. Any directional terminology like "top", "bottom", "left", "right", "above", "below", "horizontal", "vertical", "back", "front", "clockwise", "counter-clockwise" and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

High lift devices in the sense of the present invention are intended to denote any type of aircraft control surfaces that are arranged or mounted to the aircraft wings. In particular, high lift devices in the sense of the present invention may refer to hinged flight control surfaces of a fixed-wing aircraft that may be attached to the trailing or leading edge of a wing. High lift devices within the meaning of the invention may particularly comprise Fowler-type flap functionality, i.e. being able to slide towards the trailing edge of the wing before hinging downwards, thus increasing both chord length and camber of the wing.

For sake of brevity of description, the term "flap" will be used throughout the application documents to indicate any kind of high lift device that is, upon actuation, able to modify effective camber of the aircraft wing.

An angle-of-attack (AoA) in the sense of the present disclosure means the angle between a reference line on a body, for example the fuselage datum line of a fixed wing aircraft, and the direction of air motion relative to the body. The AoA stands in a predefined relationship to the coefficient of lift $c_L$, which is a dimensionless coefficient that relates the lift generated by a lifting body, such as an aircraft wing, to the density of the fluid around the body, its velocity and an associated reference area. For different shapes of the aircraft wing, in particular wing shapes subject to deployment or retraction of the associated high lift devices, the functional relationship between the AoA and the coefficient of lift $c_L$ will vary, i.e. follow different characteristic curves.

FIG. 1 schematically illustrates a top down view of an exemplary wing 10 of an aircraft, such as a fixed-wing aircraft. The wing 10 is exemplarily shown with a jet engine E, a leading edge L, a trailing edge T and a wing tip W. The aircraft moves during normal flight towards the direction of the leading edge L. The edge-to-edge distance between the leading edge L and the trailing edge T parallel to the movement direction of the aircraft is known as the chord length of the wing 10.

Apart from air brakes (spoilers) there are several control surfaces arranged in a spanwise direction of the wing 10. For example, one or more high lift flaps F are used to generate additional lift during take-off and/or landing of the aircraft. While the flaps are usually arranged proximal to the aircraft main body, one or more ailerons A are arranged distally to the aircraft body near the wing tip W. The ailerons A are typically used for shifting the lift vector of the wing 10 laterally, thus leading to rolling or banking movements of the aircraft around its horizontal axis in movement direction. Additionally, the leading edge L of the aircraft may comprise high lift slats S that are used to generate additional lift during take-off and/or landing of the aircraft as well, similar to the flaps F.

Figure 2:
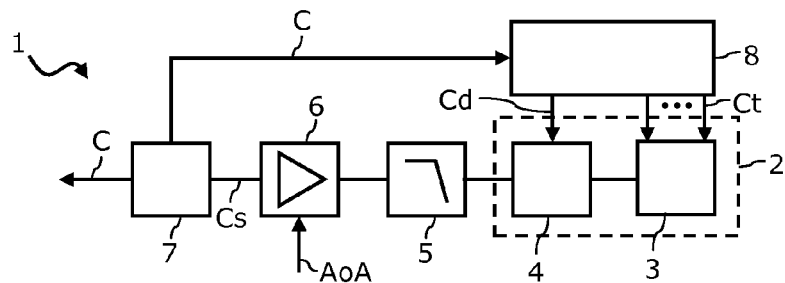
FIG. 2 schematically illustrates a block diagram of a control system for high lift devices of an aircraft according to an embodiment of the present invention.

FIG. 2 schematically illustrates a block diagram of a control system 1 for high lift devices of an aircraft. The control system 1 may for example be configured to control high lift devices such as the flaps F, ailerons A and slats S as exemplarily shown in FIG. 1. The control system 1 comprises a threshold level controller 2 that includes mainly two stages: a threshold setting unit 3 that is configured to output one of a plurality of configuration change thresholds as an active output threshold and a threshold deactivation unit 4 coupled downstream to the threshold setting unit 3 that is configured to temporarily increase the active output threshold to a deactivation value. For the functionality of the control system 1 and in particular the threshold level controller 2 reference is made throughout the following to FIGS. 3 and 4 which schematically show diagrams of angle-of-attack parameters (AoA) of subsequent high lift device configurations of the aircraft versus time (t) and coefficient of lift ($c_L$), respectively.

The threshold deactivation unit 4 is coupled to a low pass filter 5 arranged downstream of the threshold deactivation unit 4. The low pass filter 5 is configured to filter the value of the active output threshold which is output by the threshold deactivation unit 4. The filtered value of the active output threshold is input from the low pass filter to a comparator 6 that is coupled downstream of the low pass filter 5. The comparator 6 is configured to receive a measured value AoA of the angle-of-attack of the aircraft and to compare the received value AoA of the angle-of-attack with the filtered active output threshold. Depending on the result of the comparison, the comparator 6 is configured to output a configuration change trigger signal Cs to a configuration setting unit 7 arranged downstream of the comparator 6. The configuration change signal Cs is based on the comparison of the received value AoA of the angle-of-attack and the active output threshold. When the measured value AoA of the angle-of-attack of the aircraft exceeds the filtered active output threshold, the configuration setting unit 7 is configured to set the aircraft high lift device from a first configuration to a second configuration, i.e. from an active configuration position to a configuration position that is defined to be a subsequent configuration position when the active output threshold is exceeded.

The configuration setting unit 7 may effect the change in configuration for example by means of a configuration change signal C that is output to one or more of specific high lift device drivers of a hydraulically or electrically powered actuation system that mechanically operates the respective high lift devices to move from the current configuration position to the desired configuration position indicated by the configuration change signal C. The configuration positions may for example be six discrete configurations for high lift devices, such as "0", "1", "1+F", "2", "3" and "Full". The order to the configuration positions may be determined in advance and may correspond to mechanically sequential deployment angles of the respective high lift devices. The determination whether a high lift device is moving or not, i.e. the mechanical movement status, may be dependent on measured high lift device deflection angles in the actuation system.

A threshold control unit 8 is coupled to the configuration setting unit 7 and may receive the configuration change signal C as well. Moreover, the threshold control unit 8 may also receive additional information about the mechanical movement status of the high lift devices to be controlled, for example from the high lift device drivers (not explicitly shown). The threshold control unit 8 is configured to control the threshold level controller 2 in order to actively micromanage the output of the active output threshold. The threshold control unit 8 may control the threshold deactivation unit 4 to temporarily increase the active output threshold to the deactivation value while the aircraft high lift device is mechanically moving from a first configuration to a second configuration. This may be effected by means of a threshold deactivation signal Cd that may be input by the threshold control unit 8 to the threshold deactivation unit 4. The threshold deactivation unit 4 may for example be configured to hold the increased active output threshold while the threshold deactivation signal Cd is logically high.

The threshold control unit 8 may further be configured to control the threshold setting unit 3 to select one of the plurality of configuration change thresholds as the active output threshold dependent on the current configuration set by the configuration setting unit 7. This may be effected by means of one or more threshold selection signals Ct that correspond to the currently active configuration setting of the high lift device(s). The threshold selection signals Ct may for example select one of a plurality of predefined basic values for configuration change thresholds as stored in the threshold setting unit 3.

Finally, the threshold control unit 8 may additionally be configured to temporarily deactivate the low pass filter 5 while the high lift device is mechanically moving from the first configuration to the second configuration. This may be done to ensure that the active output threshold is immediately set to the increased value as defined by the threshold deactivation unit 4 under command of the threshold deactivation signal Cd. The low pass filter 5 may be re-initialized and activated again, once the high lift device has reached the second, i.e. the target configuration.

Figure 3:
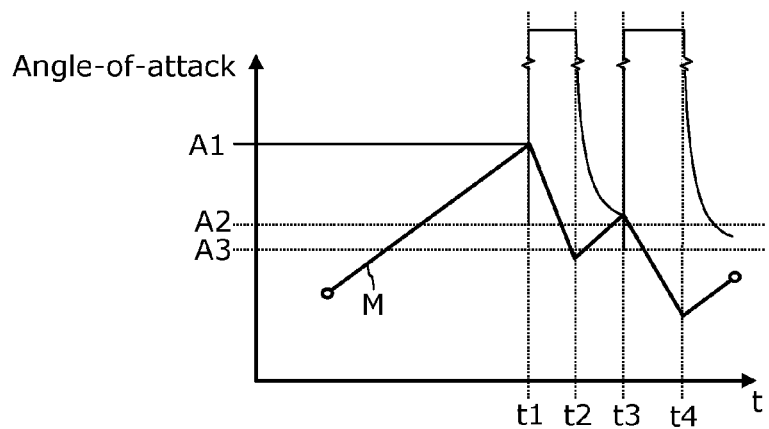
FIG. 3 schematically illustrates diagrams of angle-of-attack parameters of a high lift device configuration of an aircraft versus time according to an embodiment of the present invention.
Figure 4:
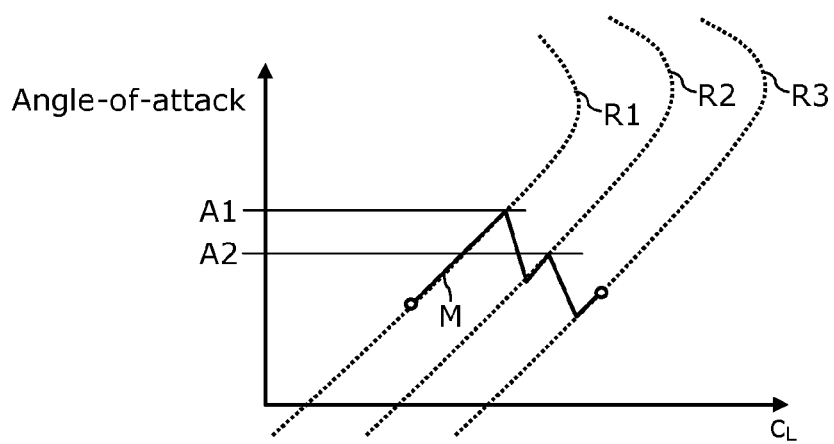
FIG. 4 schematically illustrates diagrams of angle-of-attack parameters of a high lift device configuration of an aircraft versus lift coefficient according to an embodiment of the present invention.

FIG. 3 schematically shows an exemplary measurement curve M for the angle-of-attack (AoA) of a high lift device over the course of time t. FIG. 4 shows the respective measurement curve M with respect to the coefficient of lift $c_L$ as currently generated in each phase of the scenario in FIG. 3. The scenario as depicted in FIGS. 3 and 4 may for example occur during an automatic control scheme of high lift devices of aircraft. When the measured AoA values reach distinct configuration change thresholds, commands are generated that either extend or retract the high lift device surfaces. This type of control is functioning efficiently for extension of the leading edge devices if the airspeed is reduced such as practical for approach and landing, i.e. in deliberate activation to adapt aircraft performance to flight phase related requirements, and also as a stall prevention function in case that airspeed is maintained at a high level but the load factor is significantly increased, i.e. as a protection function on an ad hoc basis.

The unique relationship between AoA, lift coefficient and airspeed (given fixed aircraft weight and a normal load factor) is depicted in FIG. 4 for three different configuration settings and is denoted as R1, R2 and R3 in each case. Hence, if the airspeed decreases, the lift coefficient $c_L$ and the AoA must increase accordingly. The lift coefficient $c_L$ at first increases linearly with the AoA up to a maximum value at a certain critical AoA value, but drops of again when the AoA is increased any further. Thus, the upper configuration change thresholds associated with each of the relationships R1, R2 and R3 (A1, A2 and A3, respectively) are selected such that, in aircraft deceleration manoeuvres, the configuration of the high lift device is changed before the AoA exceeds a critical level.

Since the relationships R1, R2 and R3 are unique for each configuration setting, the upper configuration change threshold of a subsequent configuration setting may in fact be lower than the previous upper configuration change threshold (see for example the upper configuration change threshold A2 which is in fact lower than the upper configuration change threshold A2).

Following scenario for the measurement curve M describes this phenomenon: If the airspeed decreases, the AoA increases up to the first configuration change threshold A1. At the point in time t1, this may trigger the extension of high lift devices from a first configuration position (for example "0") to a following second configuration position (for example "1"). However, this threshold A1 is higher than the threshold value A2 to trigger an extension of high lift devices from the second configuration position (in the example "1") to a subsequent third configuration position (for example "2"). Without further intervention, the control logic would—after commanding a configuration change from the first configuration position to the second configuration position—immediately issue a command for changing the configuration position to the third configuration position. Additionally, in the opposite transition direction, a command for retraction from the configuration with most extended high lift devices could result in an immediate command for full retraction to the basic configuration position. Such a control system behaviour is generally undesirable.

Therefore, at the point in time t1, when the first configuration change threshold A1 is reached, a subsequent configuration change threshold A2 is selected at the threshold setting unit 3, but at the same time temporarily increased to a deactivation value by the threshold deactivation unit 4. The increase may be some predefined amount that is generally high with respect to the general level of the thresholds A1, A2 and A3. Therefore, the active output threshold is set to the subsequent configuration change threshold A2 but artificially suspended from immediately becoming active.

In order for the increased level of the active output threshold to directly be active, the low pass filter 5 may be temporarily deactivated so that the increasing step from the first configuration change threshold A1 to the increased value of the second configuration change threshold A2 immediately becomes effective. During movement of the control surfaces of the high lift devices, the AoA may decrease gradually, until at the point in time t2, the movement is completed. Particularly the deployment of trailing edge flaps disturbs the equilibrium state of drag, weight thrust and lift forces due to an instantaneous increase of lift. The gradual decrease of AoA is a consequence of either pilots or of an automatic primary flight control system attempting to restore the aircraft equilibrium state by means of adjusting at least one longitudinal primary flight control effector such as an elevator and/or a trimmable horizontal stabilizer in order to keep the aircraft on the desired flight path once the flaps started to move. At the point in time t2, the temporary increase of the second configuration change threshold A2 is cancelled again in the threshold deactivation unit 4 and the low pass filter 5 may be activated again. As shown in the threshold curve of FIG. 3, the level of the active output threshold falls again and asymptotically approaches the basic level of the second configuration change threshold A2. At the same time, for example due to further deceleration of the aircraft, the AoA may rise again, until—at the point in time t3—the AoA surpasses the current value of the second configuration change threshold A2.

As can be seen in the example of FIG. 3, the second configuration change threshold A2 is even reached before the output of the low pass filter 5 reaches the initial level of the second configuration change threshold A2 as set by the threshold setting unit 3. Thus, another configuration change from the second configuration to a subsequent third configuration may be timely effected. Again, the third configuration change threshold A3 is temporarily increased to a deactivation value and the low pass filter 5 temporarily deactivated, until the movement of the high lift devices from the second configuration position to the third configuration position is completed at the point in time t4.

The mechanism of FIGS. 3 and 4 may not be required for the conditions that potentially trigger configuration changes in the opposite direction, i.e. the retraction of high lift devices when the AoA is gradually becoming lower, for example in acceleration manoeuvres. The lower configuration change thresholds opposite to the upper configuration change thresholds, i.e. the thresholds used to command a retraction of the high lift devices upon the AoA falling below the respective thresholds, can hence be activated in a stepwise manner without using the low pass filter 5 and the threshold deactivation unit 4 at all. This scheme may specifically be designed in compliance with aircraft regulations which require provisions that allow instantaneous reversions of command directions.

The threshold control unit 8 may additionally be configured to adjust the selected configuration change threshold depending on a measured normal load factor $n_f$. The normal load factor $n_f$ represents the ratio of the lift of an aircraft to the weight of the aircraft. Under normal flight conditions straight forward, the normal load factor $n_f$ is equal or almost equal to a value of 1, so that the selected configuration change threshold does not need to be adjusted. However, for example when the aircraft enters into a turn and moves out of the horizontal flight position, the lift need to be increased and the normal load factor $n_f$ becomes greater than 1. In order to avoid that a configuration change is triggered due to the AoA value passing a configuration change threshold just due to the fact that the lift requirement and hence also the normal load factor increased compared to normal flight conditions following initiation of a flight manoeuver such as a turn, the configuration change threshold may be adjusted by an angle of attack increment corresponding to the altered lift requirement due to the manoeuver. A possible formula to calculate the adjusted configuration change threshold A' with respect to the original level of the configuration change threshold A is $$A' = n_f A + (1-n_f) \cdot A_0,$$

wherein $n_f$ is the normal load factor and $A_0$ the angle-of-attack under flight conditions that do not generate lift. By taking into account the normal load factor, the correlation between airspeed and the actually measured angle-of-attack parameter can be mapped much more accurately. The amount by which the adjusted configuration change threshold A' may be altered compared to the original configuration change threshold A should be limited to values that ensure timely configuration changes in order to guarantee sustained flight within the safe flight envelope.

Figure 5:
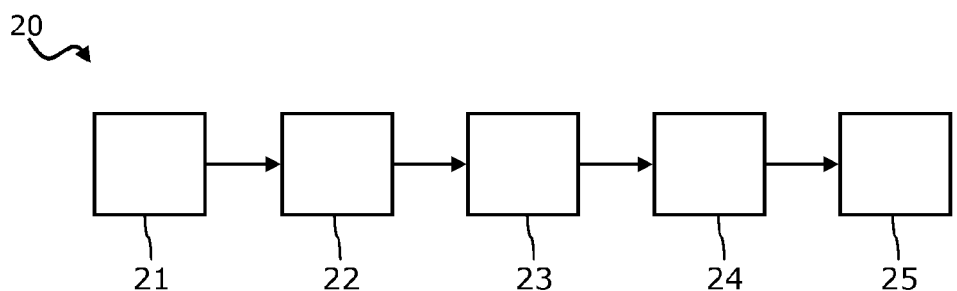
FIG. 5 schematically illustrates a method for controlling high lift devices of an aircraft according to an embodiment of the present invention.

FIG. 5 schematically illustrates a method 20 for controlling an aircraft high lift device such as an aircraft flap F, an aircraft aileron A and/or an aircraft slat S as shown in FIG. 1. The method 20 may for example be implemented using the control system 1 in FIG. 2 when taking into account the control scenario as exemplarily explained in conjunction with FIGS. 3 and 4. The method 20 comprises at 21 selecting one of a plurality of configuration change thresholds as an active output threshold. At 22, a measured value AoA of an angle-of-attack of the aircraft is compared with the active output threshold. Depending on the result of the comparison, the aircraft high lift device is commanded from a first configuration to a second configuration, if the measured value AoA of an angle-of-attack exceeds the active output threshold. At 24, another one of the plurality of configuration change thresholds is selected as active output threshold, if the aircraft high lift device is set from a first configuration to a second configuration. This newly selected active output threshold is temporarily increased at 25 to a deactivation value, while the aircraft high lift device is mechanically moving from a first configuration to a second configuration.

After the aircraft high lift device has completed the mechanical movement from the first configuration to the second configuration, the newly selected active output threshold may be decreased to the initial configuration change threshold again and the active output threshold may be a low pass filtered value of the decreased configuration change threshold, so that the level of the active output threshold gradually decreases and asymptotically approaches the initial configuration change threshold again. In that manner, the newly set configuration change threshold has a level steadily approaching the initial level of the configuration change threshold so that two guard periods may be implemented: A first (absolute) guard period is active during movement of the high lift device, so that the control system behaviour becomes predictable. The second (relative) guard period starts right at the point in time where the movement of the high lift device has concluded. The second guard period is flexible in length and adapts to the rate of change in the measure AoA which serves as an indicator for aircraft deceleration. If the aircraft decelerates quickly, the high lift devices may be set to a safer and more effective configuration position faster than with a second guard period of fixed length.

The selection of another active output threshold may be effected by outputting configuration change signal based on the comparison of the received value of the angle-of-attack and the active output threshold. This may in particular be dependent on the current configuration set by the configuration setting unit. The selected active output threshold may be low-pass filtered by a low pass filter, for example the low pass filter 5 of FIG. 2. However, while the aircraft high lift device is mechanically moving from a first configuration to a second configuration, this low-pass filtering may be temporarily deactivated or suspended. Finally, the selected configuration change threshold may be adjusted dependent on a measured normal load factor $n_f$, as described in conjunction with the threshold control unit 8 of FIG. 2 above.

Figure 6:
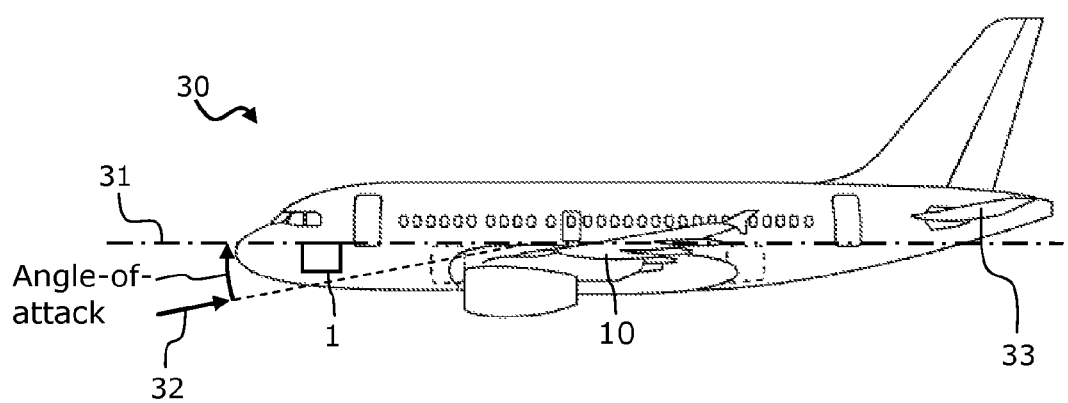
FIG. 6 schematically illustrates an aircraft having a control system for controlling high lift devices according to an embodiment of the present invention.

FIG. 6 schematically illustrates an aircraft 30, which comprises a fixed wing 10 having at least one high lift device, such as trailing edge high lift device (for example a flap F) and/or a leading edge high lift device (for example a slat S). The aircraft 30 may include a control system 1 as explained in conjunction with FIG. 2, the control system 1 being configured to control the at least one high lift device. The aircraft 30 furthermore may include a longitudinal primary flight control effector 33 such as an elevator and/or a trimmable horizontal stabilizer. Shown furthermore is the direction of air motion 32 relative to the aircraft 30 and a fuselage datum line 31 as well as the angle of attack of the aircraft 30 which is the angle between the direction of air motion 32 relative to the aircraft and a surface that on the one hand coincides with the fuselage datum line 31 and which is on the other hand perpendicular to the aircraft plane of symmetry.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system for an aircraft high lift device, the control system comprising:
   a threshold setting unit configured to output one of a plurality of configuration change thresholds as an active output threshold;
   a threshold deactivation unit coupled to the threshold setting unit and configured to temporarily increase the active output threshold to a deactivation value;
   a configuration setting unit coupled to the threshold deactivation unit and configured to set the aircraft high lift device from a first configuration to a second configuration, if a measured value of an angle-of-attack of the aircraft exceeds the active output threshold; and
   a threshold control unit configured to control the threshold deactivation unit to temporarily increase the active output threshold to the deactivation value while the aircraft high lift device is mechanically moving from a first configuration to a second configuration.

2. The control system according to claim 1, further comprising:
   a comparator coupled between the threshold deactivation unit and the configuration setting unit, the comparator being configured to receive the measured value of the angle-of-attack of the aircraft, to compare the received value of the angle-of-attack with the active output threshold and to output a configuration change signal to the configuration setting unit based on the comparison of the received value of the angle-of-attack and the active output threshold.

3. The control system according to claim 1, wherein the threshold control unit is further configured to control the threshold setting unit to select one of the plurality of configuration change thresholds as the active output threshold dependent on the current configuration set by the configuration setting unit.

4. The control system according to claim 1, further comprising:
   a low pass filter coupled between the threshold deactivation unit and the comparator, the low pass filter being configured to filter the value of the active output threshold output by the threshold deactivation unit.

5. The control system according to claim 4, wherein the threshold control unit is further configured to temporarily deactivate the low pass filter while the aircraft high lift device is mechanically moving from a first configuration to a second configuration.

6. The control system according to claim 1, wherein the threshold control unit is further configured to adjust the selected configuration change threshold dependent on a measured normal load factor.

7. An aircraft, comprising:
   a fixed wing having at least one high lift device; and
   a control system being configured to control at least one high lift device, the control system comprising:
   a threshold setting unit configured to output one of a plurality of configuration change thresholds as an active output threshold;
   a threshold deactivation unit coupled to the threshold setting unit and configured to temporarily increase the active output threshold to a deactivation value;
   a configuration setting unit coupled to the threshold deactivation unit and configured to set the aircraft high lift device from a first configuration to a second configuration, if a measured value of an angle-of-attack of the aircraft exceeds the active output threshold; and
   a threshold control unit configured to control the threshold deactivation unit to temporarily increase the active output threshold to the deactivation value while the aircraft high lift device is mechanically moving from a first configuration to a second configuration.

8. The aircraft according to claim 7, wherein the high lift device comprises a trailing edge high lift device.

9. The aircraft according to claim 8, wherein the trailing edge high lift device comprises a flap.

10. A method for controlling an aircraft high lift device, the method comprising:
    selecting one of a plurality of configuration change thresholds as an active output threshold;
    comparing a measured value of an angle-of-attack of the aircraft with the active output threshold;
    setting the aircraft high lift device from a first configuration to a second configuration, if the measured value of an angle-of-attack exceeds the active output threshold;
    selecting another one of the plurality of configuration change thresholds as active output threshold, if the aircraft high lift device is set from a first configuration to a second configuration; and
    temporarily increasing the active output threshold to a deactivation value, while the aircraft high lift device is mechanically moving from a first configuration to a second configuration.

11. The method according to claim 10, further comprising:
    outputting a configuration change signal based on the comparison of the received value of the angle-of-attack and the active output threshold.

12. The method according to claim 10, wherein selecting another one of the plurality of configuration change thresholds as the active output threshold is dependent on the current configuration set by the configuration setting unit.

13. The method according to claim 10, further comprising:
    low-pass filtering the value of the selected active output threshold.

14. The method according to claim 13, further comprising:
    temporarily deactivating the low-pass filtering of the value of the selected active output threshold while the aircraft high lift device is mechanically moving from a first configuration to a second configuration.

15. The method according to claim 10, further comprising: adjusting the selected configuration change threshold dependent on a measured normal load factor.

* * * * *